United States Patent
Surtanl et al.

(10) Patent No.: US 7,774,309 B2
(45) Date of Patent: Aug. 10, 2010

(54) DATA GRAVITATION IN A DISTRIBUTED-TREE STRUCTURE

(75) Inventors: Manik Ram Surtanl, London (GB); Jason Thomas Greene, Madison, WI (US)

(73) Assignee: Red Hat, Inc., Raleigh, NC (US)

( * ) Notice: Subject to any disclaimer, the term of this patent is extended or adjusted under 35 U.S.C. 154(b) by 438 days.

(21) Appl. No.: 11/986,243

(22) Filed: Nov. 19, 2007

(65) Prior Publication Data

US 2009/0132614 A1    May 21, 2009

(51) Int. Cl.
*G06F 17/30* (2006.01)
(52) U.S. Cl. .............. 707/635; 707/636; 707/637; 711/118
(58) Field of Classification Search ......... 707/200–204; 711/118
See application file for complete search history.

(56) References Cited

U.S. PATENT DOCUMENTS

| | | | |
|---|---|---|---|
| 6,633,891 B1 * | 10/2003 | Bamford et al. ............... 1/1 |
| 7,277,897 B2 * | 10/2007 | Bamford et al. ............... 1/1 |
| 7,315,919 B1 * | 1/2008 | O'Krafka et al. ............ 711/141 |
| 2007/0078911 A1 * | 4/2007 | Lee et al. ..................... 707/204 |
| 2009/0006593 A1 * | 1/2009 | Cortes ........................ 709/223 |
| 2009/0063588 A1 * | 3/2009 | Surtani et al. ............... 707/204 |
| 2009/0063653 A1 * | 3/2009 | Surtani ....................... 709/213 |
| 2009/0063796 A1 * | 3/2009 | Surtani et al. ............... 711/162 |
| 2009/0132657 A1 * | 5/2009 | Surtani et al. ............... 709/205 |

OTHER PUBLICATIONS

Ben Wang, JBoss Cache as a POJO Cache, Nov. 9, 2005, pp. 1-13, Published on ONJava.com.

* cited by examiner

*Primary Examiner*—Debbie Le
(74) *Attorney, Agent, or Firm*—Blakely, Sokoloff, Taylor & Zafman LLP (57) ABSTRACT

A method and apparatus for obtaining data from a cluster of cache nodes in a tree-based structure is disclosed. A querying cache node outside a partition group queries data of a cache node of the partition group. The partition group is made of one or more cache nodes of the cluster, where an instance of a cache node in the partition group is copied to each cache node in the partition group. The instance of the data of the cache nodes of the partition group is copied to the querying cache node. The partition group is adjusted to include the querying cache node as a member of the partition group.

18 Claims, 7 Drawing Sheets

DATA GRAVITATION IN A DISTRIBUTED-TREE STRUCTURE

TECHNICAL FIELD

Embodiments of the present invention relate to cache, and more specifically to a tree-structured clustered cache.

BACKGROUND

Caches are commonly used in computer system. A cache is a collection of data duplicating original values stored elsewhere or computed earlier, where the original data is expensive to fetch (due to slow access time) or to compute, relative to the cost of reading the cache. In other words, a cache is a temporary storage area where frequently accessed data can be stored for rapid access. Once the data is stored in the cache, future use can be made by accessing the cached copy rather than re-fetching or recomputing the original data, so that the average access time is lower.

Caches have proven to be extremely effective in many areas of computing because access patterns in typical computer applications have locality of reference (temporal and spatial locality). Temporal locality refers to data that are accessed close together in time. Spatial locality refers to data that might or might not be located physically close to each other.

In a clustered tree-structured cache, the cluster may also provide redundant storage for security and backup purposes by replicating data to all instances in the cache cluster. However, replicating to all instances may prove to impact memory and network traffic every time another instance is added to a cluster.

BRIEF DESCRIPTION OF THE DRAWINGS

The present invention is illustrated by way of example, and not by way of limitation, in the figures of the accompanying drawings and in which.

DETAILED DESCRIPTION

Data gravitation is a concept where data from a first node is gravitated toward a second node based on the need to access data at the second node. Data is thus removed from the first node after it has been transferred to the second node. In one embodiment, instead of removing data from the first node, the second node now joins the region where the first node is a member of. The state of the region is transferred to a new cache node that joins the group. A querying cache node (the new cache node) outside the region attempts to look up data from a cache node of the region. The region is made of one or more cache nodes, where an instance of a cache node in the region is copied to each cache node in the region. Accordingly, upon joining the region, an instance of data of the cache node of the region is copied to the querying cache node. The membership of the region is now adjusted to include the querying cache node as a member of the region.

Figure 1:
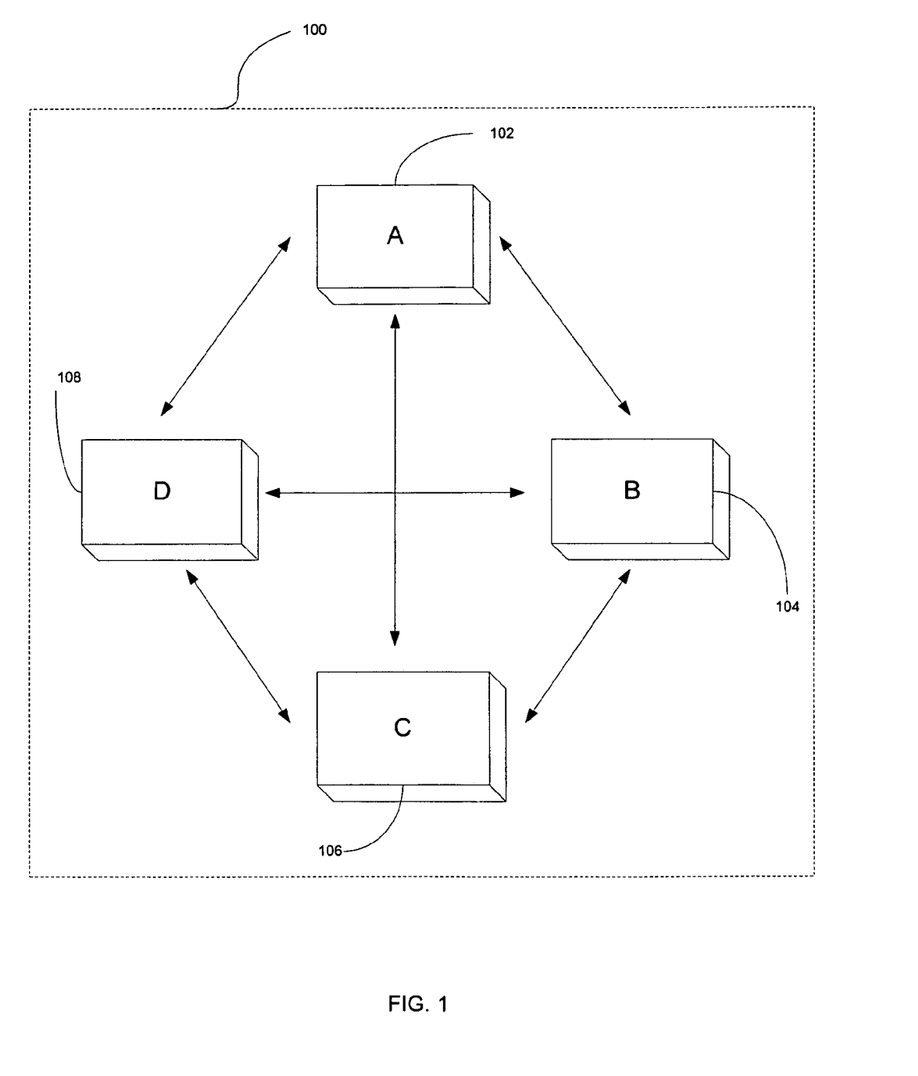
FIG. 1 illustrates a block diagram of replicated node caches in a cluster.

FIG. 1 illustrates a block diagram of replicated node caches in a cluster 100. An instance of a cache node is replicated to all cache nodes in the cluster. As such, data from cache node 102 is replicated to cache nodes 104, 106, and 108. Data from cache node 104 is replicated to cache nodes 102, 106, and 108. Data from cache node 106 is replicated to cache nodes 102, 104, and 108. Data from cache node 108 is replicated to cache nodes 102, 104, and 106. Because data from each node is replicated to all the cache nodes in the cluster, the memory and network traffic is impacted every time another instance of a cache node is added to the cluster. By limiting the replication to a limited number of "buddies", the memory and network traffic can be improved.

Figure 2:
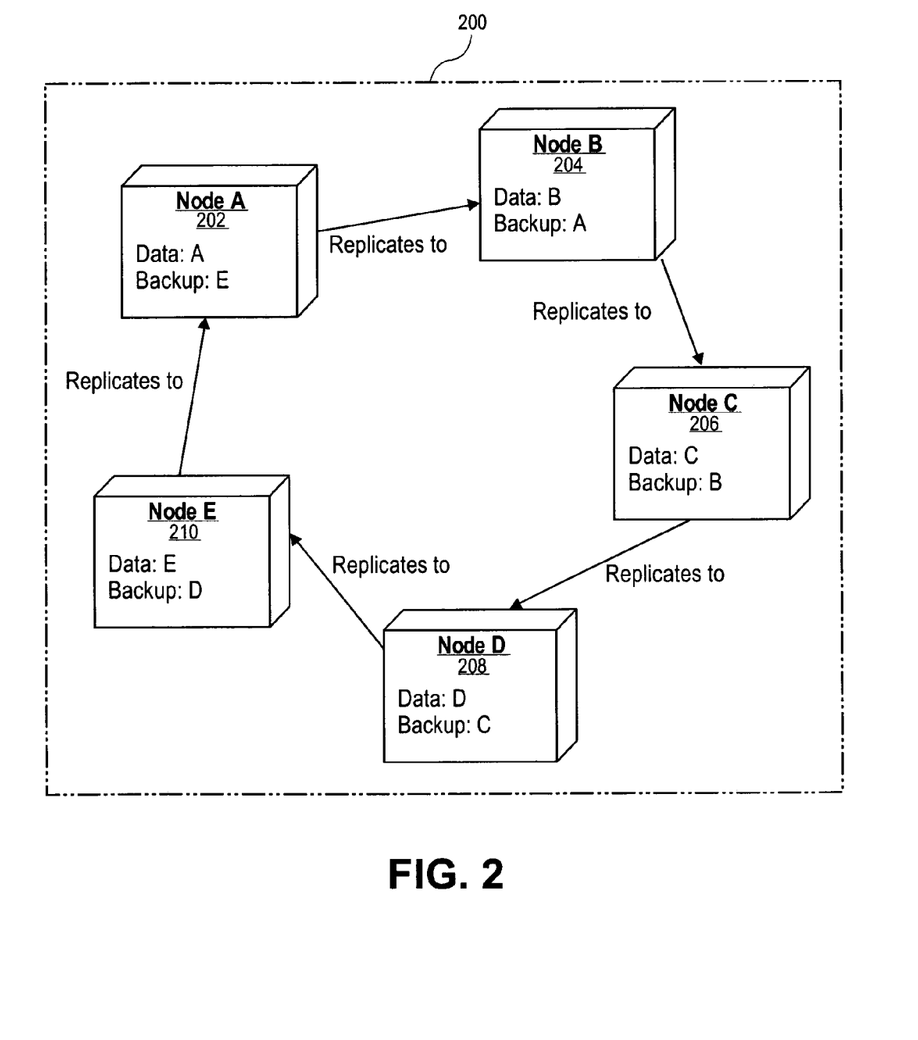
FIG. 2 illustrates a block diagram of a cluster with buddy replication of node caches.

FIG. 2 illustrates a block diagram of a cluster with limited replication of node caches. For illustration purposes, the number of buddies is set to one. FIG. 2 illustrates five nodes in a cluster: nodes A, B, C, D and E. Each node has store its own data, and the backup data of one other node. For example, node A 202 stores its own data from node A 202 and data from node E 210. Node B 204 stores its own data from node B 204 and data from node A 202. Node C 206 stores its own data from node C 206 and data from node B 204. Node D 208 stores its own data from node D 208 and data from node C 206. Node E 210 stores its own data from node E 210 and data from node D 208. As such, data is only replicated to the buddy node, not to the entire cluster (synchronous or asynchronous replication may be used). As such, data is replicated to a finite number of nodes in the cluster rather than the entire cluster resulting in a reduction of network replication traffic and reduction of node memory usage as more nodes are added. Network traffic is restricted to the number of buddy nodes configured. This may be used to broadcast changes. When the number of buddies is finite and fixed, nodes can be added to a cluster without any such impact as this replication cost is static.

In another embodiment, the cluster may be partitioned by breaking up the state in the cache and spreading it around the cluster, on sufficient nodes so that there will always be a backup somewhere. Additionally, a data gravitation algorithm may be added such that the data is always efficiently available on any given node. One embodiment of data gravitation is illustrated in FIG. 3.

Figure 3:
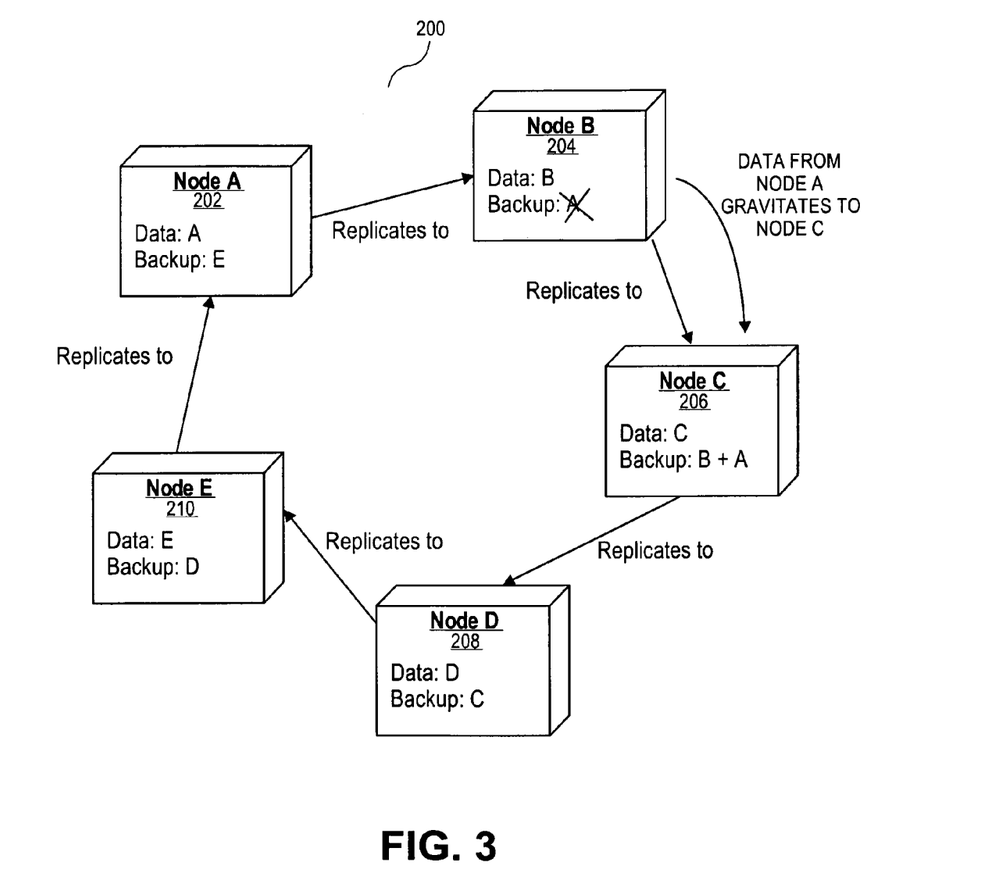
FIG. 3 illustrates a block diagram of data gravitation of data from a cache node.

FIG. 3 illustrates a block diagram of data gravitation in a cluster with buddy replication enabled. If a process at node C 206 requires data from node A 202, node C 206 requests for that data from adjacent node B 204. As node B 204 start looking for this data, data A gravitates from node B 204 to the requesting node, i.e. node C 206, which may take ownership of this data and treat it as its own. Node C 204 may also start acting as backup node for node A 202. Node B 204 no longer retains ownership of the transferred data (data A) and removes it from its memory.

In another embodiment, as requests come in to cache instances which do not have the requested data locally, nodes then ask the cluster for the data and move that data to their local state. Taking ownership of this data allows for the data most used by specific cache instances to be located closest to such cache instances. When a cache instance takes ownership of data, it forces the original owner (and any buddies) to remove this data from their in-memory state. In the above scenario of FIG. 3, this allows for the original state of A—backed up on B—to spread out evenly across the cluster as the load balancer directs requests meant for A across the cluster.

The following is an example of an implementation of data gravitation as previously illustrated in FIG. 3: a cluster-wide FLUSH operation is performed to prevent changes to the cache. The data owner of the group generates its state (excluding its _BUDDY_BACKUP_region). A state transfer of this state to the new buddy is performed. The new buddy applies this state to a new backup sub-root. The FLUSH block is released and the network resumes.

One of the prerequisites to buddy replication is the use of session affinity, more casually known as sticky sessions in HTTP session replication speak. What this means is that if certain data is frequently accessed, it is desirable that this is always accessed on one instance rather than in a round-robin fashion as this helps the cache cluster optimize how it chooses buddies, where it stores data, and minimizes replication traffic. However, the requirement of session affinity is still restrictive on other use cases—such as in data grids where data access patterns are not fixed.

In one embodiment, one way to overcome the session affinity requirement still uses BuddyGroups to define a partition group. However, buddies in the group are treated as peers, rather than data owners. Just like with buddy replication described above, changes are replicated to the entire partition group. Data gravitation is still used as a means of querying the cluster and gravitating data back. However, when data is gravitated back, rather than removing data from the sender, the receiver joins the partition group of the sender. A cache instance can be in several partition groups. This is illustrated below with respect to FIG. 4.

Figure 4:
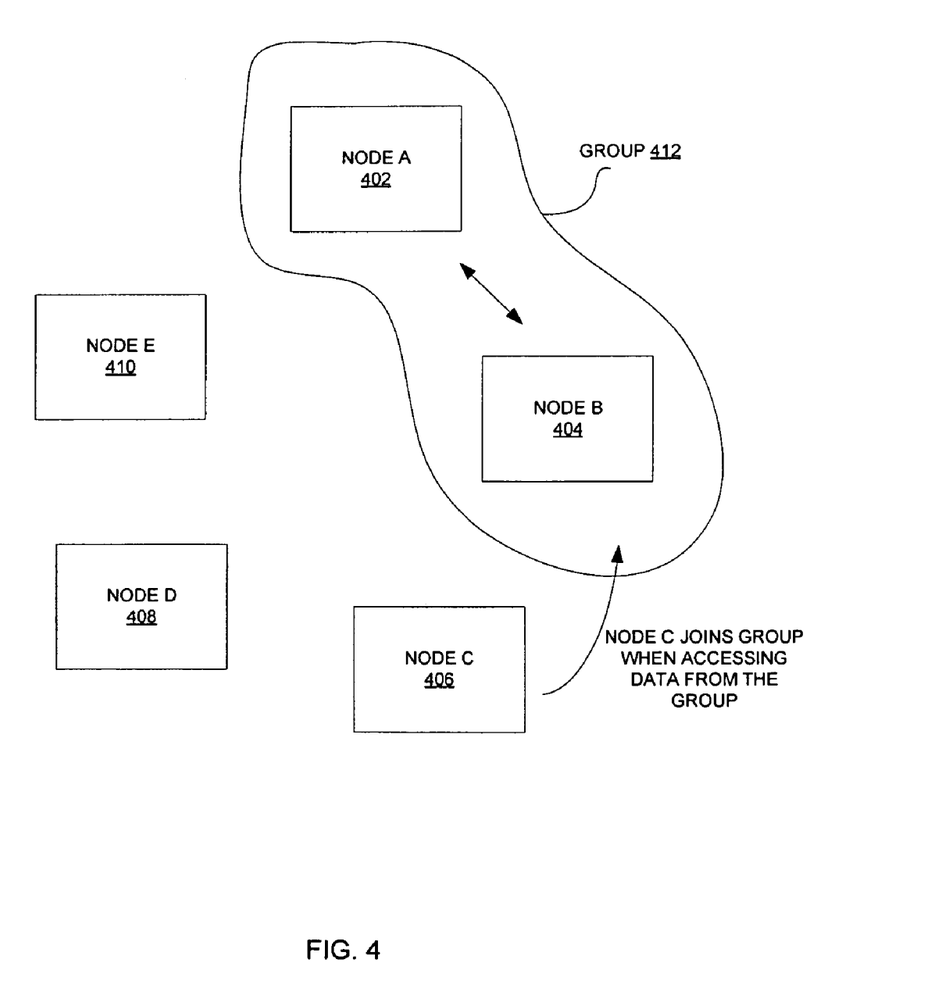
FIG. 4 illustrates a block diagram of data gravitation of data from a cache node of a group in accordance with one embodiment.

FIG. 4 illustrates a block diagram of a partition group 412 in accordance with one embodiment. Node C 406 attempts to obtain data from one or more node in group 412. By looking at the metadata of group 412, node C 406 realizes that this is a defined region where an instance of a cache node within the defined region is copied to all other cache nodes in the defined region. Instead of having data gravitate from node A 402 or node B 404 to node C 406, node C 406 now joins group 412.

In one embodiment, data gravitation as illustrated in FIG. 4 may implemented as follows: a cluster-wide (group-wide) FLUSH operation is performed to prevent changes to the cache. A single member of the group 412 is selected as the state provider, e.g. node A 402 or node B 404. The state provider generates a state for the region 412. The state is streamed to the new member (node C 406) joining the region 412 and applied directly on the recipient (node C 406), and not in a backup subtree. The FLUSH block is then released and the network resumes. Thus, the implementation of data gravitation to partition group 412 has been changed since partition groups only contain the state of a specific region rather than the entire state of a data owner. Furthermore, the concept of buddy subtrees has been removed.

Figure 5:
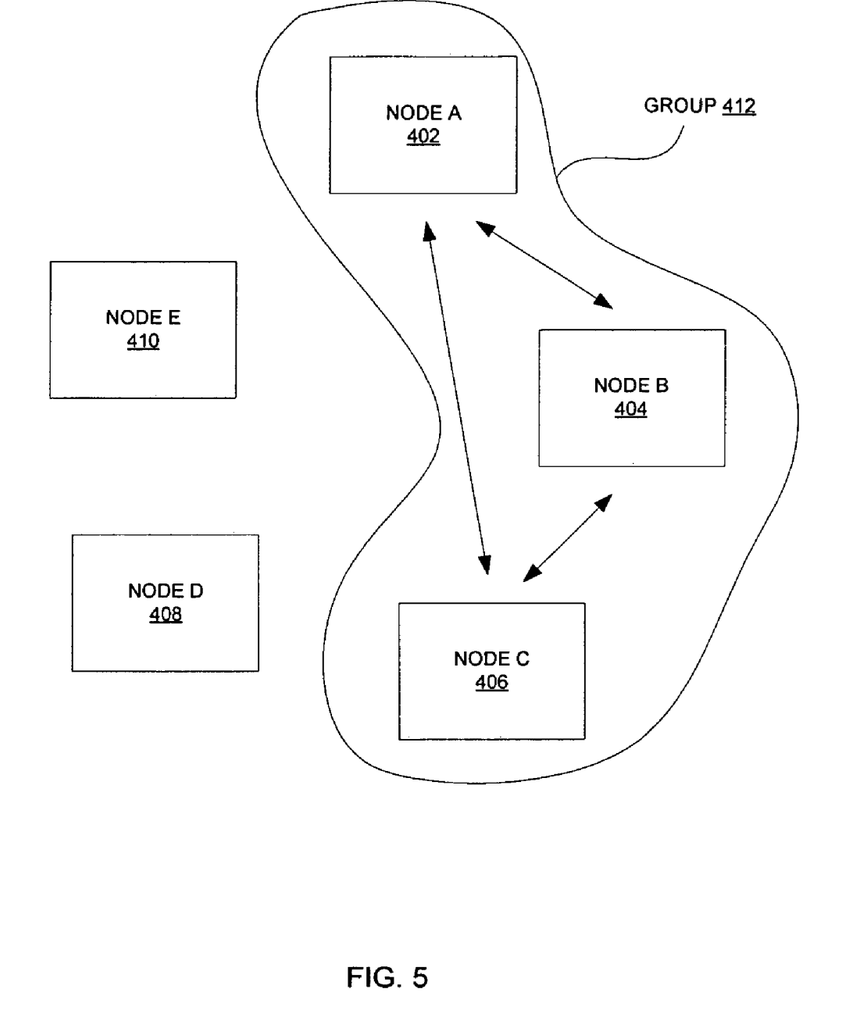
FIG. 5 illustrates a block diagram of the group of cache nodes of FIG. 4 after data gravitation in accordance with one embodiment.

FIG. 5 illustrates the new state of group 412 which now includes new cache node C 406 as a member. Cache node C 406 assumes the state of group 412 and thus includes an instance of data from node A and node B. As illustrated, each cache node stores an instance of every cache nodes in the group 412.

As discussed above, gravitation can be expensive and hence should be minimized. To do this, region metadata that is replicated across the cluster may be used. If a request for tree node N is received by an instance in the cluster, region metadata is checked to determine which region this resides in. Also, the current instance is checked to see if it is a part of this region. If so, the tree node should be available locally. If it is not available locally, a tree node is created. In the situation where the current instance is not a member of the region, the current instance then joins the region by gravitation as discussed above. If necessary, a node is created.

In another embodiment, upper and lower limits for the number of peers per partition may be imposed on group 412. Those of ordinary skills in the art will recognize that these parameters are adjustable. When node C 406 attempts to join group 412, a partial state transfer event is triggered and updated metadata are to be broadcast to redefine region 412. Metadata of the partition group may consist of the region they represent, and peers in the group—would be replicated across the entire cluster. This may be used to prevent unnecessary gravitation attempts for data that may not exist.

In one embodiment, each cache instance runs a Partition Maintenance Thread to make sure a distributed eviction takes place based on hard and soft upper and lower limits that define how many copies of each data element should exist in the partition group. In one embodiment, eviction algorithms may be used in deciding which cache instances should evict state. Regions would be the granularity of tree nodes moved around.

Figure 6:
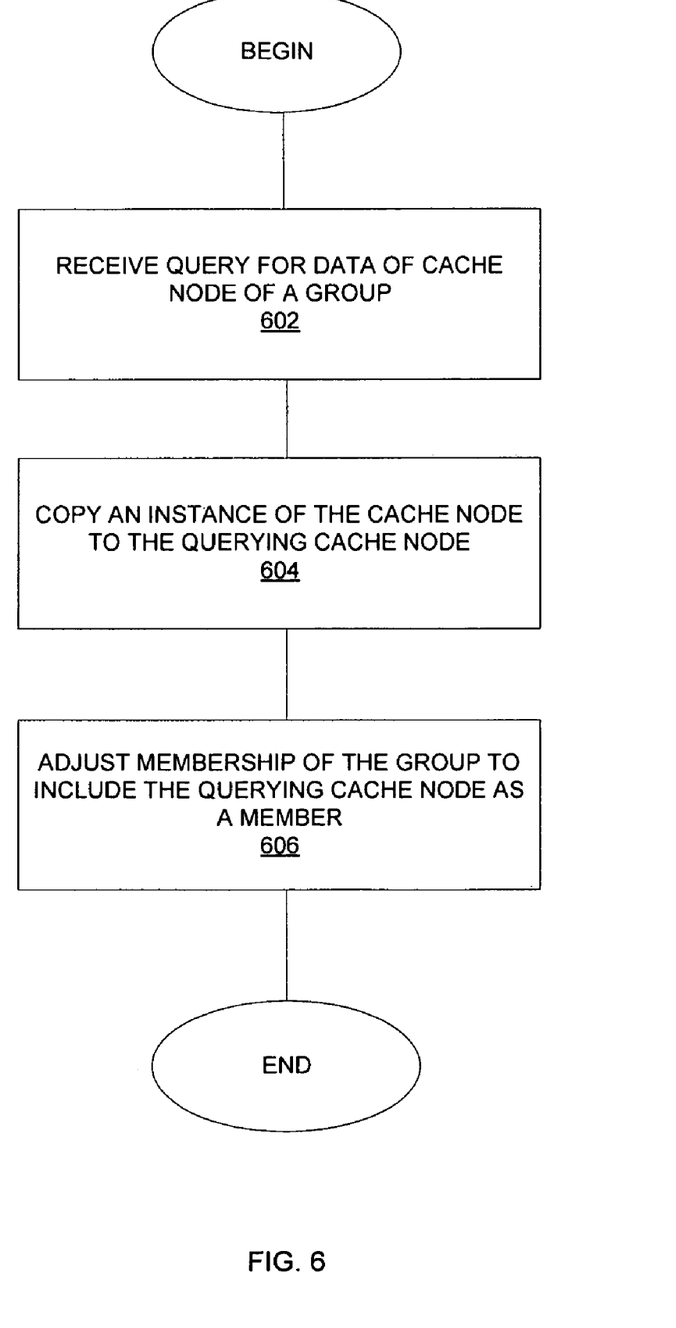
FIG. 6 illustrates a flow diagram of one embodiment of a method for data gravitation for a group of cache nodes.

FIG. 6 illustrates a flow diagram of one embodiment of a method for obtaining data from a cluster of cache nodes in a tree-based structure. At 602, a querying cache node outside a partition group queries for data of a cache node of a partition group. The partition group consists of one or more cache nodes of the cluster, where an instance of a cache node in the partition group is copied to each cache node in the partition group. At 604, the instance of the data of the cache node of the partition group is copied to the querying cache node. At 606, the partition group is adjusted to include the querying cache node as a member of the partition group.

In one embodiment, a data backup of each cache node in the partition group is queried. The instance of the data from the cache node storing the data is retained after the instance of data has been copied to the querying cache node.

In another embodiment, a cluster-wide flush block is performed to prevent changes to the cache node. A single member of the partition group is selected as a state provider, the state provider generating a state for the partition group. The state of the partition group is transferred to the querying cache node, where the state is applied directly to the querying cache node. Finally, the cluster-wide flush block is released.

In another embodiment, the membership size of the partition group is adjusted based on a partition maintenance thread of the one or more node caches of the partition group. The partition maintenance thread comprises a hard upper membership size limit, a soft upper membership size limit, a hard lower membership size limit, a soft lower membership size limit, the limits defining how many copies of each data element can exit in the partition group. A cache node can be removed from the partition group in response to the membership size of the partition group exceeding the hard upper membership size limit.

Computer System

Figure 7:
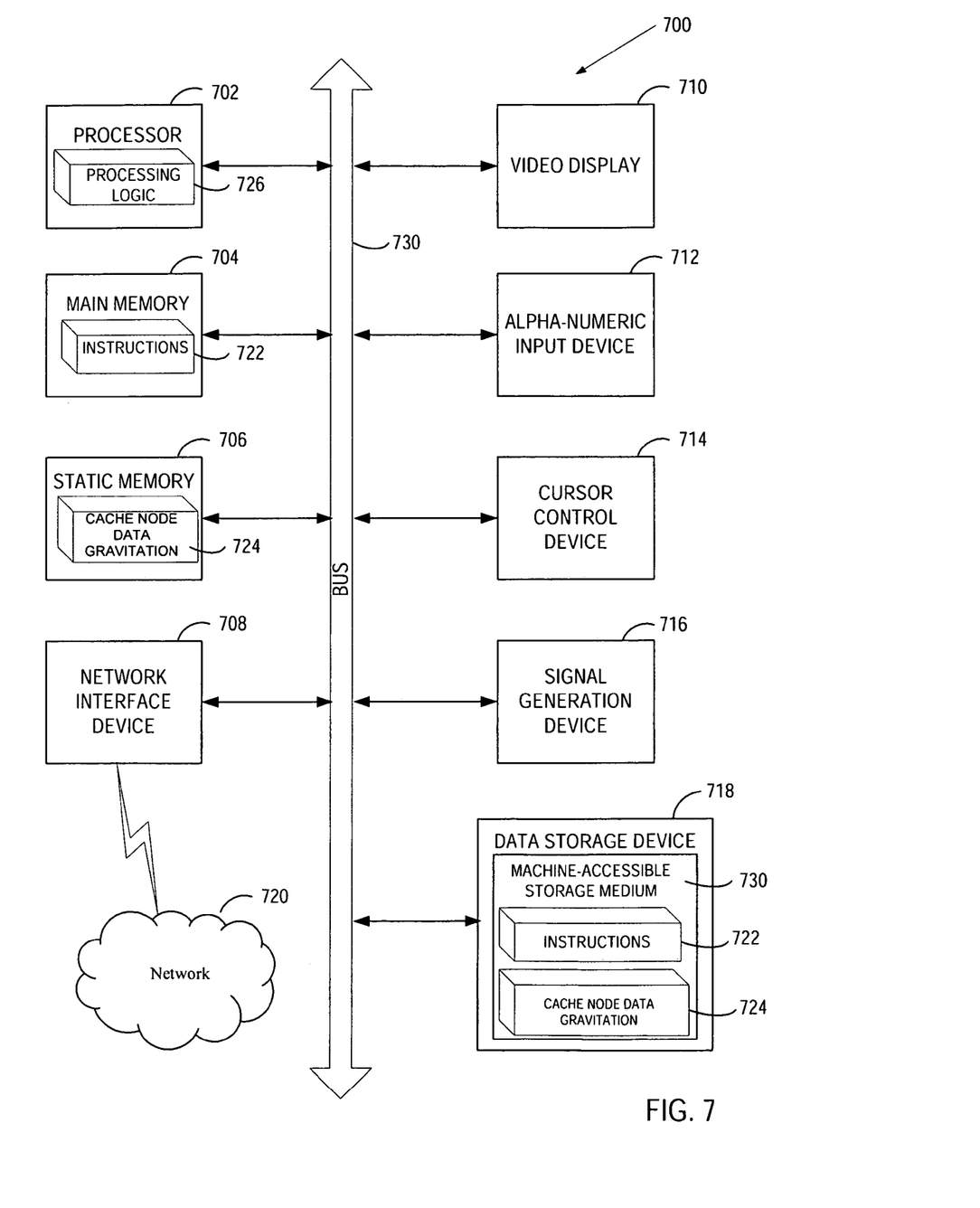
FIG. 7 illustrates a block diagram of an exemplary computer system.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more general-purpose processing devices such as a microprocessor, central processing unit, or the like. More particularly, the processing device may be complex instruction set computing (CISC) microprocessor, reduces instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 730 on which is stored one or more sets of instructions (e.g., software 722) embodying any one or more of the methodologies or functions described herein. The software 722 may also reside, completely or at least partially, within the main memory 704 and/or within the processing device 702 during execution thereof by the computer system 700, the main memory 704 and the processing device 702 also constituting machine-accessible storage media. The software 722 may further be transmitted or received over a network 720 via the network interface device 708.

The machine-accessible storage medium 730 may also be used to store dynamic partitioning instructions 724. Dynamic partitioning instructions 724 may also be stored in other sections of computer system 700, such as static memory 706.

While the machine-accessible storage medium 730 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

Thus, a method and apparatus for replicating cache nodes in a tree-structure cache cluster have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method for obtaining data from a cluster of cache nodes in a tree-based structure, the method comprising:

receiving a query for data of a cache node of a partition group from a querying cache node outside the partition group, the partition group comprising one or more cache nodes of the cluster, wherein an instance of a cache node in the partition group is copied to each cache node in the partition group;

copying the instance of the data of the cache nodes of the partition group to the querying cache node;

adjusting the partition group to include the querying cache node as a member of the partition group; and adjusting the membership size of the partition group based on a partition maintenance thread of the one or more node caches of the partition group, wherein the partition maintenance thread comprises a hard upper membership size limit, a soft upper membership size limit, a hard lower membership size limit, a soft lower membership size limit, the limits defining how many copies of each data element can exist in the partition group.

2. The computer-implemented method of claim 1 further comprising:

querying a data backup of each node in the partition group; and retaining the instance of the data from the cache node storing the data after the instance of the data has been copied to the querying cache node.

3. The computer-implemented method of claim 2 further comprising:

performing a cluster-wide flush block to prevent changes to the cache node;

selecting a single member of the partition group as a state provider, the state provider generating a state for the partition group;

transferring the state of the partition group to the querying cache node, wherein the state is applied directly to the querying cache node; and releasing the cluster-wide flush block.

4. The computer-implemented method of claim 1 further comprising:

removing a cache node from the partition group in response to the membership size of the partition group exceeding the hard upper membership size limit.

5. The computer-implemented method of claim 1 further comprising:

removing a cache node from the partition group in response to a distributed eviction initiated by an initiating cache node from the partition group.

6. The computer-implemented method of claim 1 wherein a metadata is associated with the partition group, the metadata comprising an identification of a region represented by the partition group and an identification of peer cache nodes in the partition group.

7. An apparatus for obtaining data from a cluster of cache nodes in a tree-based structure comprising:

a storage device comprising the cluster of cache nodes in a tree-based structure; and a processing device coupled to the storage device, the processing device configured to receive a query for data of a cache node of a partition group from a querying cache node outside the partition group, the partition group comprising one or more cache nodes of the cluster, wherein an instance of a cache node in the partition group is copied to each cache node in the partition group, to copy the instance of the data of the cache nodes of the partition group to the querying cache node, to adjust the partition group to include the querying cache node as a member of the partition group, and to adjust the membership size of the partition group based on a partition maintenance thread of the one or more node caches of the partition group, wherein the partition maintenance thread comprises a hard upper membership size limit, a soft upper membership size limit, a hard lower membership size limit, a soft lower membership size limit, the limits defining how many copies of each data element can exist in the partition group.

8. The apparatus of claim 7 wherein the processing device is configured to query a data backup of each node in the partition group, and retain the instance of the data from the cache node storing the data after the instance of the data has been copied to the querying cache node.

9. The apparatus of claim 8 wherein the processing device is configured to further perform a cluster-wide flush block to prevent changes to the cache node, to select a single member of the partition group as a state provider, the state provider generating a state for the partition group, to transfer the state of the partition group to the querying cache node, wherein the state is applied directly to the querying cache node, to release the cluster-wide flush block.

10. The apparatus of claim 7 wherein the processing device is configured to remove a cache node from the partition group in response to the membership size of the partition group exceeding the hard upper membership size limit.

11. The apparatus of claim 7 wherein the processing device is configured to remove a cache node from the partition group in response to a distributed eviction initiated by an initiating cache node from the partition group.

12. The apparatus of claim 7 wherein a metadata is associated with the partition group, the metadata comprising an identification of a region represented by the partition group and an identification of peer cache nodes in the partition group.

13. A non-transitory computer-readable storage medium, having instructions stored therein, which when executed, cause a computer system to perform a method comprising:

receiving a query for data of a cache node of a partition group from a querying cache node outside the partition group, the partition group comprising one or more cache nodes of the cluster, wherein an instance of the cache node in the partition group is copied to each cache node in the partition group;

copying the instance of the data of the cache nodes of the partition group to the querying cache node; and adjusting the partition group to include the querying cache node as a member of the partition group, adjusting the membership size of the partition group based on a partition maintenance thread of the one or more node caches of the partition group, wherein the partition maintenance thread comprises a hard upper membership size limit, a soft upper membership size limit, a hard lower membership size limit, a soft lower membership size limit, the limits defining how many copies of each data element can exist in the partition group.

14. The non-transitory computer-readable storage medium of claim 13 wherein the method further comprises:

querying a data backup of each node in the partition group; and retaining the instance of the data from the cache node storing the data after the instance of the data has been copied to the querying cache node.

15. The non-transitory computer-readable storage medium of claim 14 wherein the method further comprises:

performing a cluster-wide flush block to prevent changes to the cache node;

selecting a single member of the partition group as a state provider, the state provider
generating a state for the partition group;
transferring the state of the partition group to the querying cache node, wherein the state is applied directly to the querying cache node; and
releasing the cluster-wide flush block.

16. The non-transitory computer-readable storage medium of claim 13 wherein the method further comprises:
removing a cache node from the partition group in response to the membership size of the partition group exceeding the hard upper membership size limit.

17. The non-transitory computer-readable storage medium of claim 13 wherein the method further comprises:
removing a cache node from the partition group in response to a distributed eviction initiated by an initiating cache node from the partition group.

18. The non-transitory computer-readable storage medium of claim 13 wherein a metadata is associated with the partition group, the metadata comprising an identification of a region represented by the partition group and an identification of peer cache nodes in the partition group.

* * * * *